United States Patent [19]

Sasuta

[11] Patent Number: 5,682,601

[45] Date of Patent: Oct. 28, 1997

[54] METHOD FOR PROVIDING COMMUNICATION HANDOFF IN A MULTIPLE SITE COMMUNICATION SYSTEM

[75] Inventor: Michael D. Sasuta, Mundelein, Ill.

[73] Assignee: Motorola, Inc., Schaumburg, Ill.

[21] Appl. No.: 552,044

[22] Filed: Nov. 2, 1995

Related U.S. Application Data

[63] Continuation of Ser. No. 81,716, Jun. 25, 1993, abandoned.

[51] Int. Cl.$^6$ ................................................. H04Q 7/00
[52] U.S. Cl. ....................... 455/33.2; 455/53.1; 455/54.2; 455/56.1
[58] Field of Search ..................... 455/33.2, 33.4, 455/34.1, 34.2, 53.1, 54.1, 54.2, 56.1, 62, 67.1; 379/60

[56] References Cited

U.S. PATENT DOCUMENTS

| | | | |
|---|---|---|---|
| 4,670,899 | 6/1987 | Brody | 455/33.4 |
| 5,189,734 | 2/1993 | Bailey et al. | 455/33.2 |
| 5,222,248 | 6/1993 | McDonald et al. | 455/33.2 |
| 5,230,082 | 7/1993 | Ghisler et al. | 455/33.2 |
| 5,301,356 | 4/1994 | Bodin et al. | 455/33.2 |
| 5,303,289 | 4/1994 | Quinn | 455/33.2 |

Primary Examiner—Reinhard J. Eisenzopf
Assistant Examiner—Thanh Le
Attorney, Agent, or Firm—Christopher P. Moreno

[57] ABSTRACT

In a multi-site communication system, a communication may be handed off from a first site to a second site in the following manner. Upon request and when a communication resource is available, a communication resource allocator allocates the communication resource to the requesting communication unit located in the first site. The communication resource allocator also identifies a reserved communication resource in each adjacent site to the first site. When the communication unit relocates to the second site of the adjacent sites, the communication resource allocator allocates the reserved communication resource of the second site to the communication unit without a request from the communication unit.

15 Claims, 3 Drawing Sheets

METHOD FOR PROVIDING COMMUNICATION HANDOFF IN A MULTIPLE SITE COMMUNICATION SYSTEM

This is a continuation of application Ser. No. 08/081,716, filed Jun. 25, 1993 and now abandoned.

FIELD OF THE INVENTION

The present invention relates generally to multi-site communication systems, and in particular, to a method of communication handoff.

BACKGROUND OF THE INVENTION

Multiple site communication systems are known to comprise a plurality of sites, a plurality of communication units, such as mobile/portable radios or cellular telephones, and a limited number of communication resources which are allocated to the communication units by at least one communication resource allocator. Within such a system, the potential exists for any communication unit to engage in a communication of relatively long duration such that the communication unit may roam outside the coverage area of the site in which the call was originated. When travelling into the coverage area of a new site, it is desirable for the communication to be transparently continued (transparent to the communication unit user) in the new site. To accomplish this, upon entering the new site, the communication unit transmits a request for allocation of a communication resource in the new site. When a resource is available, the communication continues on the allocated resource with no significant interruptions to the user. If, however, the communication unit travels into a site that does not have an available communication resource, the call is temporarily or permanently discontinued. In either situation, the communication unit must transmit a request for a communication resource in the new site, which adds congestion on the control channel and limits overall efficiency.

Prior art solutions to this problem addressed the non-availability of resources issue, but at a cost. For example, some cellular communication systems provide communication handoffs as described above, i.e. upon entering a new site, request a communication resource and obtain one if available, but don't relinquish the presently allocated resource until a new one is available. This allows the communication to continue but the quality of the communication degrades. The degradation continues until the communication is dropped or a resource in the new site becomes available. In such a case, the communication must be restarted, if desired, by the communication unit user.

Therefore, a need exists for a method which substantially guarantees resource availability in adjacent sites when a currently engaged communication unit travels outside the coverage area of the originating site without a request from the communication unit.

DESCRIPTION OF A PREFERRED EMBODIMENT

Generally, the present invention provides a method to facilitate a handoff of a communication between adjacent sites within a multi-site communication system. In such a method, a communication resource allocator supports the communication handoff by maintaining reserved communication resources in adjacent sites to a first site which is currently supporting the communication. These reserved communication resources are to be used in the event that the communication unit involved in the communication relocates in one of these adjacent sites while the communication is active. In this event, the communication is routed to the appropriate reserved communication resource in the second site, and the call continues with no interruption of service and without a communication resource request from the communication unit.

Figure 1:
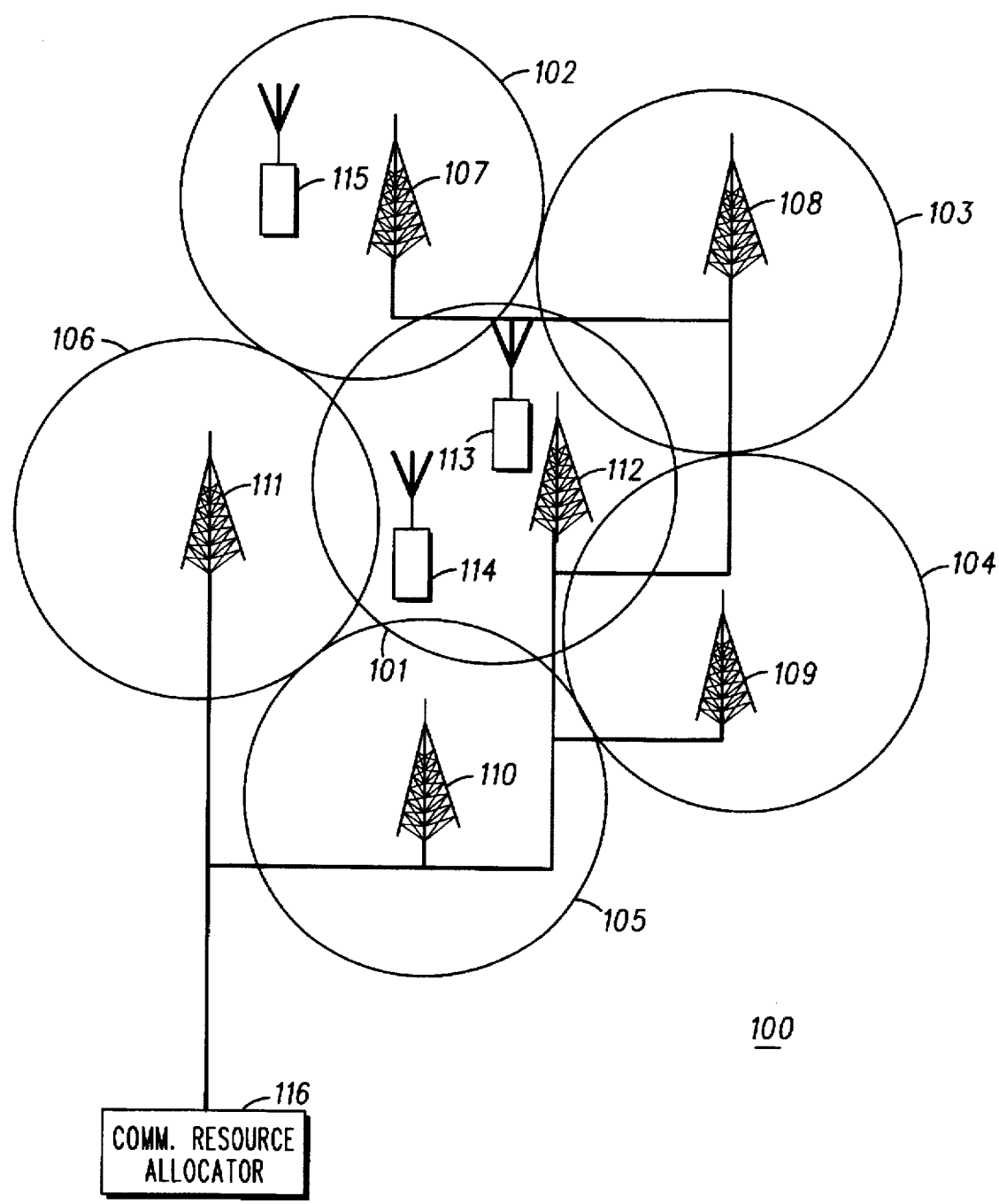
FIG. 1 illustrates a multi-site communication system in accordance with the present invention.

The present invention can be more fully described with reference to FIGS. 1, 2 and 3. FIG. 1 illustrates a communication system (100) that includes multiple communication sites (101–106), sets of communication resources (107–112), communication units (113–115), and a communication resource allocator (116). The sets of communication resources (107–112) associated with the communication sites (101–106) may comprise multiple RF (radio frequency) channels such as pairs of frequency carriers, time division multiplex (TDM) slots, or any other RF transmission mediums.

Figure 2:
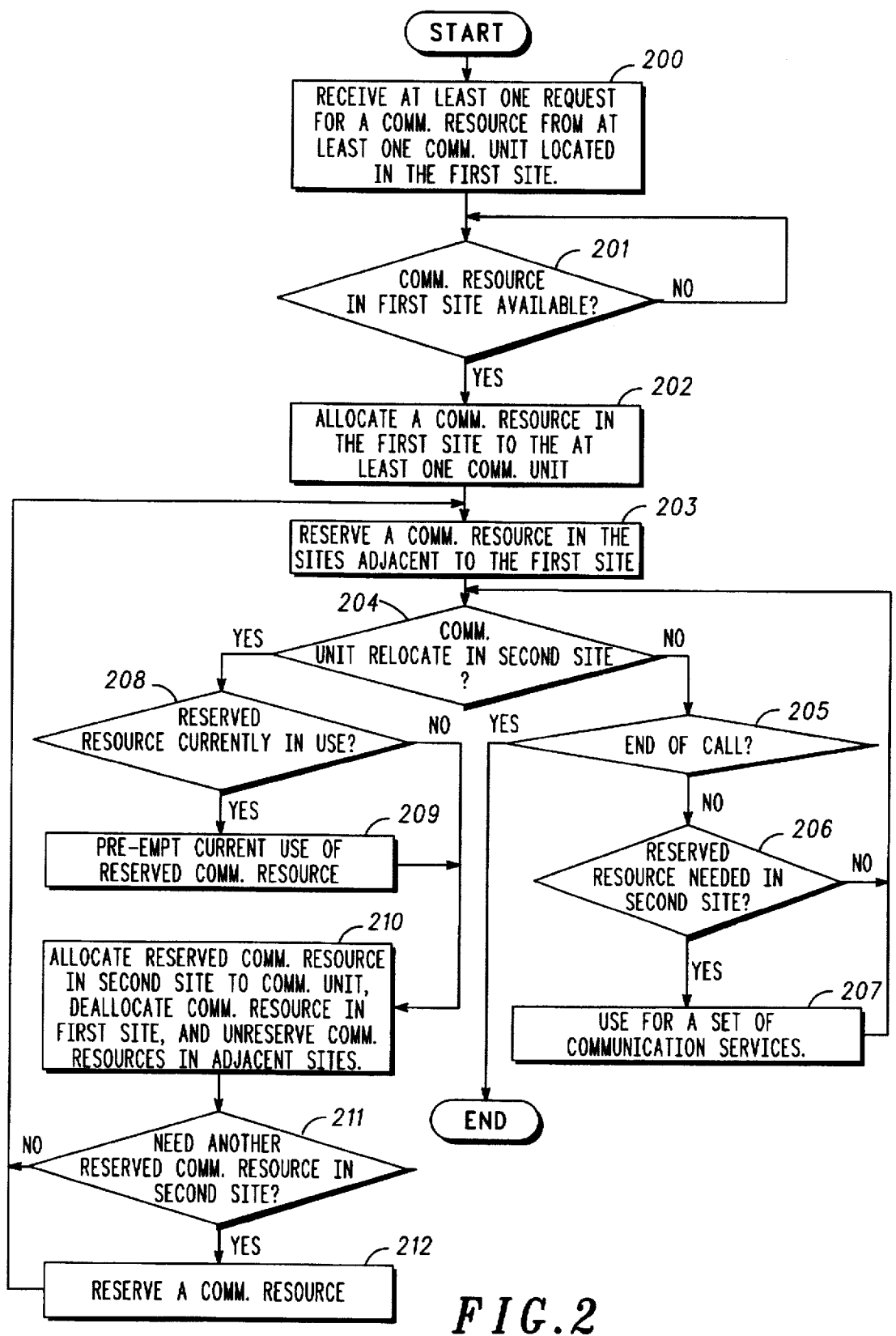
FIG. 2 illustrates a logic diagram which a communication resource allocator may incorporate to implement the present invention.

FIG. 2 illustrates a logic diagram that the communication resource allocator (116) may incorporate to implement the present invention. At step (200), at least one communication unit (114) currently residing in the first site (101) initiates a request for a communication resource (112). It is understood that any of the communication sites (101–106) shown could function as the first site in the event that a communication unit initiates a communication while operating within their respective coverage areas. Furthermore, requests for communication resources are well understood in the art, thus no further discussion will be presented. Upon receiving the request for a communication resource (112), the communication resource allocator (116) waits (201) until an appropriate communication resource (112) is available in the first site (101). The selection of an available communication resource (112) in the first site (101) is based upon matching the needs of the requesting communication unit (114) to the current usage of the communication resources (112) at the site (101). When a communication resource (112) becomes available, the communication resource allocator (116) allocates (202) the communication resource (112) to the communication unit (114).

Having established a communication for the communication unit (114) in the first site (101), the communication resource allocator (116) also determines those sites of the communication system (100) that are adjacent to the first site (101). The communication resource allocator (116) is then able to reserve (203) a communication resource in each of the adjacent sites. As an example utilizing FIG. 1, the adjacent sites to the first site (101) are sites (102) through (106). Each of these sites (102–106) would have a communication resource reserved from their sets of communication resources (107–111), respectively, for future use by the communication unit (114).

The communication resource (107–111) reserved in each site of the adjacent sites (102–106) is selected based upon a resource availability profile. The resource availability profile comprises a database within the communication resource allocator (116) that includes, but is not limited to, such elements as the service support capability of each of the communication resources of the set of communication resources (107–112), and the current assignability of each communication resource (e.g. not currently allocated, currently allocated with low priority, currently allocated with high priority, etc.). Additionally, a communication unit profile can be used to more optimally determine those adjacent sites requiring reserved communication resources. The communication unit profile comprises a database within the communication resource allocator (116) that includes, but is not limited to, such elements as past and current location information of the roaming communication unit and a current travel vector. The communication unit profile can then be used by the communication resource allocator (116) to determine in which of the adjacent sites (102–106) it is most probable for the communication unit (114) to relocate during the call, thus reducing the number of adjacent sites (102–106) which need to reserve a communication resource (107–111) for potential use by the communication unit (114). While the reserved communication resource information is normally maintained at the communication resource allocator (116) for use when the communication unit (114) relocates to an adjacent site, the communication resource allocator (116) can also identify the reserved communication resource(s) to the communication unit (114) for its local use.

Continuing with FIG. 2, it is determined if the communication unit (114) has relocated (204) to a second site of the adjacent sites (102–106). While the communication unit (114) stays within the coverage area of the first site (101), the service is processed in a normal manner by the communication resource allocator (116). If the call ends (205), the use of communication resources (112) by the communication unit (114) are cancelled by the communication resource allocator (116).

If the call has not ended (205), it is determined (206) whether the adjacent sites (102–106) with reserved communication resources have communication resource service needs pending (206). In the event that the reserved communication resource in each of the adjacent sites (102–106) is not needed to satisfy the service request for communication unit (114), the communication resource reserved at each of the adjacent sites (102–106) may be used to satisfy other communication service needs which arise. A limited set of communication services which can utilize the reserved communication resource can be a subset of the full set of communication services normally applied to the communication resource. Typically the limited set of communication services is composed of services that generally do not utilize the reserved communication resource for an extended period of time (less than a few minutes), and/or is a low priority communication service compared to the communication service for which the communication resource is originally reserved. The limited set of communication services may include group dispatch call service local to the adjacent site or individual call service local to the adjacent site. Furthermore, the limited set of communication services allowed is configurable and independent for each reserved communication resource of the adjacent sites. If the pending communication service request at the site of the reserved communication resource is one of the services contained in the limited set of communication services, then the reserved communication resource may be allocated to this pending communication service (207).

When the communication unit (114) relocates to a second (adjacent) site (204), the reserved communication resource at the second site will be needed to satisfactorily continue the communication service, hence it is necessary to determine if the reserved communication resource is currently being used at the second site (208). For example, if the communication unit (114) relocates in the second site (106), the reserved communication resource (111) associated with this site is checked, by the communication resource allocator (116), for current usage. If the reserved communication resource (111) is not currently being used, then the reserved communication resource (111) is allocated (210) to the communication unit (114) without the communication unit having to transmit a resource request, thus saving valuable control channel bandwidth.

If the reserved communication resource (111) in the second site is currently in use (209), the current use of the reserved communication resource (111) is preempted to allow the communication resource to be allocated (210) to the communication unit (114). The communication resource (112) allocated to the communication unit (114) in the first site (101) is subsequently deallocated (210) and is therefore free for other use as determined by the communication resource allocator (116). If there were reserved communication resources (107–110) in any of the remaining adjacent sites (102–105), the reserved status for these communication resources is cancelled (210).

If a second communication unit (113) has also requested a communication service within the first site (101) while the first communication unit (114) is active in the first site, the adjacent sites (102–106) could have more than one communication unit associated with the reserved communication resources (107–111). In this case there is the potential for the second communication unit (113) and the first communication unit (114) to need a reserved communication resource (107–111) simultaneously in any one of the adjacent sites (102–106). While more than one communication resource may be required to satisfy all the communication service needs potentially destined for an adjacent site (102–106), in a preferred embodiment, less than the maximum number of reserved communication resources is actually reserved within any one adjacent site (102–106), and in general this is reduced to a single communication resource reservation at any given time. Thus, when the reserved communication resource (111) of the second site (106) is allocated to the first communication unit (114), it is determined if a second reserved communication resource is needed (211) at the second site. If there are no other communication resource reservation requirements (211), then the communication service associated with the first communication unit (114) continues with the second site (106) now considered to be the new first site. Processing continues at step 203, as described previously.

If there is a need (211) for additional communication resource reservation at the second site (106), then a second communication resource is reserved. The communication service associated with the first communication unit (114) continues processing at the second site (106), with the second site (106) now considered to be the new first site. As before, processing continues at step 203.

It is acknowledged that one could incorporate portions of the logic diagram of FIG. 2 in a communication unit to implement the present invention. That is, after receiving allocation of a communication resource in the first site (101), the communication unit (114) can reserve, via the communication resource allocator (116), identity of a reserved communication resource in a second site in a manner identical to that described above. Thus, when the communication unit (114) relocates into the second site, it may affiliate itself with the reserved communication resource, subject to the restrictions described previously.

Figure 3:
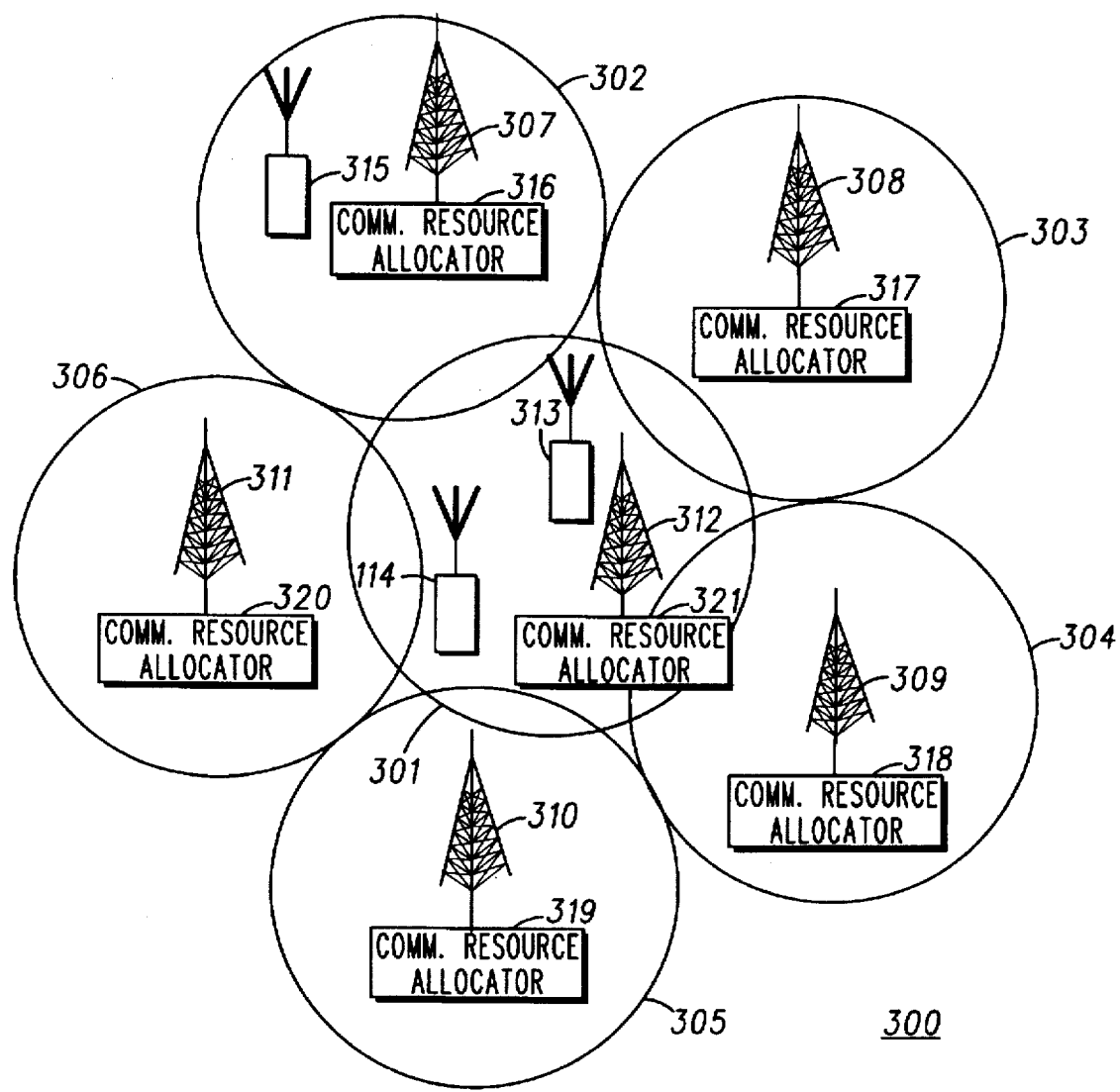
FIG. 3 illustrates another multi-site communication system in accordance with the present invention.

FIG. 3 illustrates another multi-site communication system (300) comprising multiple communication sites (301–306), sets of communication resources (307–312), communication resources (313–315), and communication resource allocators (316–321). This multi-site communication system (300) has distributed communication resource allocation, such that there is a communication resource allocator (316–321) associated with each site (301–306). The distributed communication resource allocator architecture depicted in FIG.3 processes communications in a similar manner as the communication system shown in FIG. 1, with the additional need for peer-to-peer communications between the multiple communication resource allocators (316–321) to allow communication resource reservation between, and communication resource allocation in, the communication sites (301–306).

As an example of the operation of the communication system (300), assume at least one communication unit (315) initiates a communication service request in a first site (302). The communication resource allocator (316) at the first site (302) handles this service request. The communication resource allocator (316) determines the availability of communication resources (307) at the first site (302) and allocates an available communication resource of the set of communication resources (307) to satisfy the communication service request of the communication unit (315).

Having established a communication for the communication unit (315) in the first site (302), the communication resource allocator (316) also determines those sites of the communication system (300) that are adjacent to the first site (302). In the example of FIG. 3, the adjacent sites to the first site (302) are sites (301), (303), and (306). The communication resource allocator (316) communicates the need for a reserved communication resource to the communication resource allocators (317, 320, and 321) for each of these adjacent sites (301, 303, and 306), respectively. Each of the communication resource allocators (317, 320, and 321) in the adjacent sites (301, 303, and 306) will maintain reservation of a communication resource of their individual sets of communication resources (308, 311, and 312), respectively.

When the communication unit (315) relocates to a second site of the adjacent sites (301, 303, and 306), the reserved communication resource associated with the second site is allocated for the communication associated with the communication unit (315) without the communication unit (315) having to request a communication resource. This allocation of the reserved communication resource is communicated to the communication resource allocator (316) of the first site (302), which then informs the remaining adjacent sites of the adjacent sites (301, 303, and 306) that their respective previously reserved communication resources are no longer required for the communication of communication unit (315). As before, the determination of the new set of adjacent sites and appropriate communication resource reservations begins again at the new first site.

The present invention provides a method to facilitate a handoff of a communication between adjacent sites within a multi-site communication system. With such a method, the potential for unavailable communication resource is substantially eliminated. By determining adjacent sites to the current communication service site and making communication resource reservations in these sites, the problem of communication resource availability for communication service handoff is substantially eliminated. Further, the handoff can be made without the communication unit requesting a resource in the new site, thus saving valuable control channel bandwidth.

I claim:

1. In a multi-site communication system that includes a plurality of communication units, a plurality of sites, a limited number of communication resources distributed throughout the plurality of sites, and a communication resource allocator that allocates the limited number of communication resources among the plurality of communication units upon request, a method for providing a handoff of a communication occurring in a first site to a second site, the method comprises the steps of:

a) receiving, by the communication resource allocator, a request for a communication resource from at least one communication unit located in the first site;

b) when a communication resource is available in the first site, allocating, by the communication resource allocator, the communication resource to the at least one communication unit;

c) reserving, by the communication resource allocator responsive to the request, a communication resource in adjacent sites to the first site to produce a reserved communication resource in each site of the adjacent sites, wherein each reserved communication resource is available for future use by the at least one communication unit and is available for allocation to another communication unit for a particular communication service from a limited set of communication services; and d) when the at least one communication unit relocates in the second site of the adjacent sites, allocating, by the communication resource allocator, the reserved communication resource in the second site to the at least one communication unit.

2. In the method of claim 1, step (c) further comprises selecting the reserved communication resource in each site of the adjacent sites based on a resource availability profile.

3. The method of claim 2 further comprises allocating, prior to allocation to the at least one communication unit, one of the reserved communication resources in one of the adjacent sites to another communication unit for a particular communication service from a limited set of communication services.

4. The method of claim 3 further comprises preempting, in the second site, the allocation of the reserved communication resource when the at least one communication unit relocates in the second site.

5. In the method of claim 1, the at least one communication unit includes a first communication unit and a second communication unit, wherein step (d) further comprises reserving a second communication resource in the second site of the adjacent sites to produce a second reserved communication resource when the first communication unit has relocated in the second site and the second communication unit is still located in the first site, wherein the second reserved communication resource is available for future use by the second communication unit.

6. The method of claim 1 further comprises the steps of:

e) when the at least one communication unit relocates in the second site, deallocating, by the communication resource allocator, the communication resource in the first site; and f) when the at least one communication unit relocates in the second site, unreserving, by the communication resource allocator, the reserved communication resource in each site of the adjacent sites.

7. In a multi-site communication system that includes a plurality of communication units, a plurality of sites, a limited number of communication resources distributed throughout the plurality of sites, and a communication resource allocator that allocates the limited number of communication resources among the plurality of communication units upon request, a method for providing a handoff of a communication occurring in a first site to a second site, the method comprises the steps of:

a) receiving, by the communication resource allocator, a request for a communication resource from at least one communication unit located in the first site;

b) when a communication resource is available in the first site, allocating, by the communication resource allocator, the communication resource to the at least one communication unit;

c) reserving, by the communication resource allocator responsive to the request, a communication resource in at least one adjacent site to produce at least one reserved communication resource available for future use by the at least one communication unit, wherein the at least one adjacent site is identified by a communication unit profile of the at least one communication unit; and d) when the at least one communication unit relocates in the second site of the at least one adjacent site, allocating, by the communication resource allocator, the reserved communication resource in the second site to the at least one communication unit.

8. In the method of claim 7, step (c) further comprises reserving a communication resource in the at least one adjacent site based on the communication unit profile, wherein the communication unit profile identifies past and current locations of the at least one communication unit, and a current travel vector of the at least one communication unit, within the first site.

9. In the method of claim 7, step (c) further comprises selecting the at least one reserved communication resource in the at least one adjacent site based on a resource availability profile.

10. The method of claim 9 further comprises allocating, prior to allocation to the at least one communication unit, one of the at least one reserved communication resource in one of the adjacent sites to another communication unit for a particular communication service from a limited set of communication services.

11. The method of claim 10 further comprises preempting, in the second site, the allocation of the at least one reserved communication resource when the at least one communication unit relocates in the second site.

12. In the method of claim 7, wherein the at least one communication unit includes a first communication unit and a second communication unit, step (d) further comprises reserving a second communication resource in the a second site of the at least one adjacent site to produce a second reserved communication resource when the first communication unit has relocated in the second site and the second communication unit is still located in the first site, wherein the second reserved communication resource is available for future use by the second communication unit.

13. The method of claim 7 further comprises the steps of:

e) when the at least one communication unit relocates in the second site, deallocating, by the communication resource allocator, the communication resource in the first site; and f) when the at least one communication unit relocates in the second site, unreserving, by the communication resource allocator, the at least one reserved communication resource in each site of the at least one adjacent sites.

14. In a multi-site communication system that includes a plurality of communication units, a plurality of sites, a limited number of communication resources distributed throughout the plurality of sites, and a communication resource allocator that allocates the limited number of communication resources among the plurality of communication units upon request, a method for a communication unit in a first site to assist in a handoff of a communication to a second site, the method comprises the steps of:

a) requesting, by the communication unit in the first site, a communication resource from the communication resource allocator;

b) when the communication resource is available in the first site, receiving, by the communication unit, allocation of the communication resource;

c) receiving, by the communication unit responsive to the step of requesting, identity of a reserved communication resource in the second site, wherein the reserved communication resource is available for future use by the communication unit;

d) when the communication unit relocates in the second site, affiliating, by the communication unit, with the reserved communication resource without transmitting a request for a communication resource in the second site.

15. In a multi-site communication system that includes a plurality of communication units, a plurality of sites, a limited number of communication resources distributed throughout the plurality of sites, and a plurality of communication resource allocators, wherein the communication resources within each site of the plurality of sites are allocated by a communication resource allocator of the plurality of communication resource allocators among the plurality of communication units upon request, a method for providing a handoff of a communication occurring in a first site to a second site, the method comprising the steps of:

a) receiving, by the communication resource allocator in the first site, a request for a communication resource from at least one communication unit located in the first site;

b) when a communication resource is available in the first site, allocating, by the communication resource allocator in the first site, the communication resource to the at least one communication unit;

c) transmitting, by the communication resource allocator in the first site, a request for a communication resource to the communication resource allocators in each adjacent site to the first site;

d) reserving, by the communication resource allocator in each adjacent site to the first site responsive to the request from the communication resource allocator in the first site, a communication resource to produce a reserved communication resource in each site of the adjacent sites, wherein each reserved communication resource is available for future use by the at least one communication unit; and e) when the at least one communication unit relocates in the second site of the adjacent sites, allocating, by the communication resource allocator in the second site, the reserved communication resource in the second site to the at least one communication unit, the method further comprising a step of allocating, prior to allocation to the at least one communication unit, one of the reserved communication resources in one of the adjacent sites to another communication unit for a particular communication service from a limited set of communication services, and a step of preempting, in the second site, the allocation of the reserved communication resource when the at least one communication unit relocates in the second site.

* * * * *